L. D. SNOOK.
Hop Trellis.

No. 77,775.

Patented May 12, 1868.

WITNESSES:

INVENTOR:

United States Patent Office.

LORENZO D. SNOOK, OF BARRINGTON, NEW YORK.

Letters Patent No. 77,775, dated May 12, 1868.

IMPROVEMENT IN HOP-TRELLIS.

The Schedule referred to in these Letters Patent and making part of the same.

TO ALL WHOM IT MAY CONCERN:

Be it known that I, LORENZO D. SNOOK, of Barrington, in the county of Yates, and State of New York, have invented a new and useful Improvement in Hop-Trellis; and I do hereby declare that the following is a full, clear, and exact description of the construction and operation of the same, reference being had to the annexed drawings, making a part of this specification, in which—

The letters of reference refer to the same parts in each figure.

The nature of my invention consists in making a stake for a hop-trellis of two parts, whereby pieces of wood can be used in their construction, which will cost but little, and is readily obtained; also using horizontal training-poles of strips of wood, crossing each other at right angles at each post or stake; they rest upon hooks driven into each stake near its upper end; the whole being arranged so that the bearing portion of the vine can be instantly lowered and the hops picked therefrom.

To enable others skilled in the art to make and use my invention, I will proceed to describe its mode of construction and operation.

A is a stake; it is driven into the ground, and left projecting any required number of feet or fractions thereof. In the upper end is bored a hole lengthwise of the stake, and of any size or depth required, the object of the hole being for the reception of the upper or sectional stake B, hereinafter specified. By using the stake in two parts, the part in the ground may be removed when decayed or broken, and a new one substituted without injuring the growing vine; also can be readily driven when raised up by the action of frost.

Figure 1:
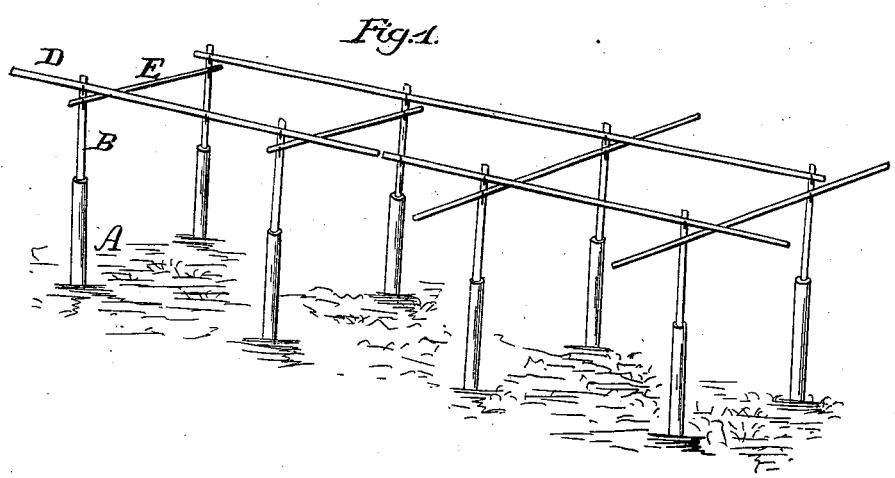
Figure 1 is a perspective view.
Figure 2:
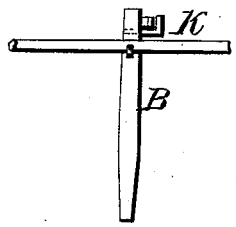
Figure 2 is a sectional view.

B is one of a series of poles or stakes; they form the upper portion of the stake upon which the hop-vine climbs before reaching its bearing-point; it is shown in a perspective view in fig. 1, and a section thereof in fig. 2; it may be of any length desired for convenient cultivation of hops; it may be made round or square, or of any shape desired, its lower portion being made to fit into the hole in the upper end of the stake A. Into and near the upper end of the stake B are driven two hooks, K and K, as hereinafter specified, for supporting the horizontal poles D and E, as shown in each figure.

K is a hook; it may be made of wire, or iron from a plate, or formed in any other way, and of any kind of material, and of the form shown in fig. 2, or one equivalent to it. Two hooks are driven in each of stakes B, so that when the horizontal poles D and E are laid on them, they will cross each other at right angles, as shown in fig. 1.

D and E are poles or pieces sawed for the purpose; they must not be large, as the weight they will be required to support will be light. Each horizontal pole passes beyond two stakes, and half way to the next one at each side, or from stake to stake. Each pole can be instantly taken down and the hops picked, and then returned to its place upon the hooks or stored away under shelter.

Having thus fully described my invention, what I claim as new, and desire to secure by Letters Patent, is—

The horizontal poles D and E, when supported at right angles upon the upper sections B of the stakes, as specified, by means of the hooks K, and used in combination with the sectional stakes A B, substantially as and for the purpose set forth.

LORENZO D. SNOOK.

Witnesses:
JOHN L. LEWIS,
CHARLES KETCHUM.